United States Patent
Peled et al.

(10) Patent No.: US 6,337,159 B1
(45) Date of Patent: Jan. 8, 2002

(54) LITHIUM ANODE WITH SOLID ELECTROLYTE INTERFACE

(75) Inventors: Emanuel Peled, Even Yehuda; Avi Melman, Holon; Chen Menachem, Ariel; Yitzhak Lavi, Bet Yitzhak; Dany Bar-Tov, Ramat Gan, all of (IL)

(73) Assignee: Ramot University Authority for Applied Research & Industrial Development Ltd., Tel Aviv (IL)

( * ) Notice: Subject to any disclaimer, the term of this patent is extended or adjusted under 35 U.S.C. 154(b) by 0 days.

(21) Appl. No.: 08/913,188

(22) PCT Filed: Mar. 6, 1996

(86) PCT No.: PCT/US96/03157

§ 371 Date: Feb. 4, 1999

§ 102(e) Date: Feb. 4, 1999

(87) PCT Pub. No.: WO96/27908

PCT Pub. Date: Sep. 12, 1996

(30) Foreign Application Priority Data

Mar. 7, 1995 (IL) ................................. 112907

(51) Int. Cl.$^7$ .......................... H01M 4/58; H01M 10/40
(52) U.S. Cl. ................. 429/231.4; 429/231.8; 429/231.95; 429/218
(58) Field of Search .......... 429/231.95, 231.8, 429/236, 246, 212, 217, 218, 231.4

(56) References Cited

U.S. PATENT DOCUMENTS

| | | | | |
|---|---|---|---|---|
| 5,130,211 A | * | 7/1992 | Wilkinson | 429/198 |
| 5,232,795 A | * | 8/1993 | Simon | 429/192 |
| 5,310,553 A | * | 5/1994 | Simon | 429/212 |
| 5,443,928 A | * | 8/1995 | Takeuchi | 429/218 |
| 5,679,480 A | * | 10/1997 | Takahashi | 429/218 |
| 5,824,120 A | * | 10/1998 | Mitchell | 29/623.1 |
| 5,908,715 A | * | 6/1999 | Liu | 429/217 |
| 6,027,833 A | * | 2/2000 | Ueda | 429/218.1 |
| 6,096,454 A | * | 8/2000 | Tran | 429/231.8 |
| 6,103,423 A | * | 8/2000 | Itoh | 429/231.8 |

\* cited by examiner

*Primary Examiner*—Gabrielle Brouillette
*Assistant Examiner*—Mark Ruthkosky
(74) *Attorney, Agent, or Firm*—Eitan, Pearl, Latzer & Cohen-Zedek

(57) ABSTRACT

A non-aqueous electrochemical cell comprising a cathode, non-aprotic or polymeric electrolyte and an anode of carbon-based bonded particles coated with a thin (less than 1 micron thick) solid electrolyte interphase which is a M conductor and electronic insulator consisting of alkali metal or alkaline earth salts, oxides or sulfides, said cell being assembled in the non-charged state.

27 Claims, 3 Drawing Sheets

LITHIUM ANODE WITH SOLID ELECTROLYTE INTERFACE

Figure 1:
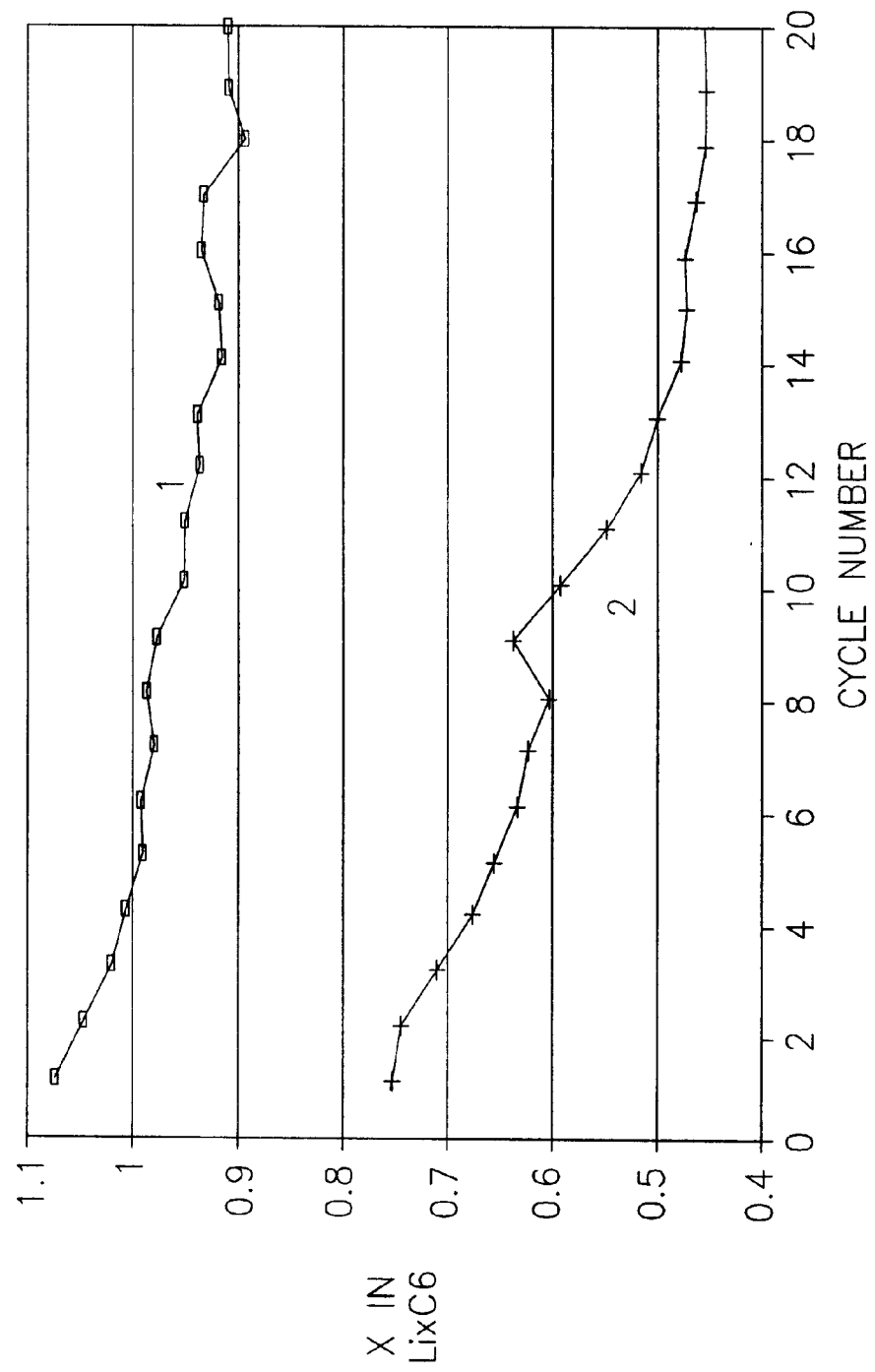

This application is a 371 of PCT/US96/03157, filed Mar. 6, 1996.

INTRODUCTION/BACKGROUND

Safety considerations lead to the replacement of pure lithium by heavier carbonaceous materials, with the general formula $Li_xC_6$, as anodes for lithium batteries.

In order to minimize the loss in energy density due to this replacement, X which is the molar ratio between 6 carbons and Li, in $Li_xC_6$ must be maximized and the irreversible capacity loss ($Q_{IR}$) in the first charge of the battery must be minimized. The maximum value for the reversible intercalation of lithium (DX) depends on the carbon type and is typically between 0.5 (186 mAh/g carbon) for non-graphitic carbon to 1 (372 mAh/g carbon) for graphites. There is a larger variation in $Q_{IR}$ between 30% to 90%. It was generally found that $Q_{IR}$ is larger for graphites than for petroleum coke. Therefore in order to be able to benefit from the use of graphite, (having X=1), means should be taken to decrease its $Q_{IR}$. $Q_{IR}$ is attributed to SEI (Solid Electrolyte Interphase) formation and to exfoliation of the graphite.

When a carbonaceous electrode is cathodically polarized to potentials lower than 2.0 V vs. lithium, several reactions take place: Lithium intercalation with or without co-intercalation of solvent molecules, partial or complete reduction of solvent molecules and anions, precipitation of insoluble reduction products to form a Solid Electrolyte Interphase (SEI), diffusion of partially reduced species (such as semicarbonates) from the surface of the carbon into the solution, reduction-induced polymerization of solvent molecules (such as cyclic ethers and esters). At potentials lower than 0.5V, dissolution of solvated electrons into the electrolyte takes place. The fraction or yield of each reaction depends on: type of carbon, type of salt and solvents, temperature, impurities and potential (current density). Further reactions depend on electrolyte stability. In highly purified electrolytes which consist of thermodynamically stable anions (like I) and kinetically stable solvents such as ammonia, some amines and ethers, the solvated electrons exist for long periods of time (hours). These electrolytes are for obvious reasons, not suitable for use in practical lithium batteries. In "battery-grade" ether-based electrolytes, or when reducible anions such as $AsF_6$ or reducible solvents such as PC are used, these solvated electrons immediately react to form SEI on the electrode.

Highly graphitized carbons have a large capacity, but suffer from solvent co-intercalation and degradation in performance. In ether-, PC- and MF-rich solutions, the solvent co-intercalation is a significant problem, while EC addition alleviates the problem. If reversible, it may cause disintegration (exfoliation) of the graphite crystallites as a result of large variation in the lattice spacing (large changes in $d_{002}$). The large variation in dimension may cause cracks in the "protective" SEI which lead to further (and faster) electrolyte reduction and more co-intercalation. Reduction of the intercalated molecules may yield gasses (such as ethane and propane in EC and PC solutions) inside the graphite crystallites. This may cause exfoliation and cracks in the SEI. Once the co-intercalation of solvent molecules starts, it will be very difficult to prevent. Therefore it must be prevented from the outset i.e. prior to or in the first charge. We believe that high quality SEI can eliminate or effectively prevent the co-intercalation of solvent molecules and the degradation process described above.

SUMMARY OF THE INVENTION

The present invention relates to non-aqueous batteries whose anode comprise carbon-based particles bounded by appropriate binders, which binders may also be a carbon-based material, which carbonaceous particles (beads, powder, wiskers, etc.), are coated by a thin, submonolayer of up to 0.1 $\mu$m solid electrolyte interphase (SEI), which film is an $M^+$ conductor and electronic insulator and consists of alkali (M) or alkaline-earth metal (MA) salts, oxides or sulfides or a mixture of these which optionally contains up to 30% organic binder or polymers, which salts are insoluble in the battery electrolyte and which preferably are fluorides, chlorides, carbonates, semicarbonates, surface carboxylic salts or a mixture of these, which SEI is chosen to be compatible with the particular electrolyte of the battery. According to a preferred embodiment the solid electrolyte interphase is chemically bonded to the surface of the carbonaceous particles, preferable through oxygen bonds.

The carbonaceous material can be chosen amongst others from graphite and non-graphitic carbons which optionally contains up to 10% (atomic weight) additional elements chosen from the group of N,B,Al,Ca,Mg and Si.

Preferably, the carbonaceous particles are partially oxidized at a suitable temperature by a suitable gas selected from: dry or wet air, $O_2$ or $Cl_2$ to form very narrow, up to 1 nm in width, preferably 0.3 to 0.6 nm holes, pits, cracks or flaws, the carbon losses in this process being up to 30% of its weight, preferably 3 to 15%.

A suitable temperature range for this process in air and for nongraphitized carbons is 300 to 500° C. and for graphitized carbons it is 450 to 640° C., depending on carbon structure, degree of graphitization surface area and impurities. Following this oxidation process, the carbon may be treated with alkali or alkaline earth hydroxides (or basic salts, such as carbonates) to neutralize the surface acidic groups and turn them into a thin layer of surface carboxylic salts, chemically bound to the carbon surface. If not, these acidic surface groups will be neutralized (turn into lithium salt) in the first charge of the battery.

The carbonaceous based particles are preferably partially oxidized by dry or wet air or oxygen, where the temperature and time are optimized for each carbon material to obtain a maximum of surface acidic groups and minimum surface basic groups at a minimal weight loss (less than 3% weight loss) optionally followed by neutralization by alkali or alkaline metal hydroxides.

Anodes of the batteries of the invention may comprise carbon-based particles which were oxidized to form surface acidic groups by the use of oxidizing agents such as aqueous solutions of $H_2O_2$, $H_2SO_4$, $HNO_3$, $KClO_4$, KClO, etc., washed and neutralized by an alkali metal or alkaline earth metal hydroxide or their basic salts.

The carbon based particles can be coated by a thin, up to 2 nm layer of chemically bonded alkali metal or alkaline metal carbonate formed by:

a) first formation of surface basic group by reaction of clean surface (free of surface groups) carbon with wet air at low temperatures (up to 150° C.);

b) reaction with an alkali or alkaline earth metal hydroxide at preferably 100–200° C. or with $MAH_2$ or MH to form C—O—M or (C—(O)$_2$—MA surface groups;

c) reaction with $CO_2$ gas at room temperature to form C—O—$CO_2$M or C—O—$CO_2$)$_2$MA surface groups, i.e. a thin chemically bound alkali carbonate surface film.

The SEI or a part of can be formed by a dissolution of the SEI materials or its precursors in a proper solvent or solvents mixture and casting a thin layer on the carbonaceous particles followed by a heat treatment if needed. Organic elastomer up to 30% (V/V) can be added to the casting solution. A preferred SEI can be formed by treatment of these carbon particles by an appropriate amount of aqueous solution of an alkali metal carbonate optionally with water soluble polymer such as PEO and evaporating the water to form 1–10 nm thick carbonate layer. The SEI or a part of it may be formed by chemical vapor deposition or thermal decomposition of an appropriate SEI precursors.

The invention further relates to a non-aqueous battery consists of a carbon based anode, an appropriate aprotic non-aqueous electrolyte and suitable cathode the carbon of which was formed by dehydration of a carbohydrate such as ($C_6O_6H_{12}$), a polysaccharide, cellulose or starch with general formula ($C_6O_5H_{10}$)n either by reaction with concentrated $H_2SO_4$ or by moderate temperature pyrolysis of these carbohydrates in an inert atmosphere. The carbon particles thus formed may be further heat treated under an inert atmosphere preferably at 400–1600° C., and may further be processed as set out above. These carbons have a broad PXRD peak at scattering angle of 22 degrees as measured with a CuαK diffractometer.

The electrolyte may consist of one or more of ethyl carbonate, propylene carbonate, dimethylcarbonate, diethylcarbonate, and methylformate, the salt selected from one or a mixture of $LiPF_6$, $LiAsF_6$, $CF_3SO_3Li$, $LiClO_4$, $LiN(CF_3SO_2)_2$ and the cathode consist of one of the groups; $LiMn_2O_4$, $LiMnO_2$, $Li_1CoO_2$, $LiNiO_2$, $LiCo_x Ni_{(1-x)}O_2$ and preferably assembled in the discharged state.

The electrolyte may consist of ionically conductive polymer electrolyte based on polyethylene oxide) polyacrilo nitrile, polyvinilidene difluoride, and polymetamethyl methacrylate polymers or their mixture, the salts described above, which polymer electrolyte may contain up to 80% (volume) solvent or mixture of solvents defined above.

DESCRIPTION OF PREFERRED EMBODIMENTS

The object of the present invention is to provide negative carbon based electrodes for long life, high capacity, high power, rechargeable non-aqueous batteries. The present invention provides means to decrease the irreversible capacity ($Q_R$) which is lost in the first charge of such batteries to increase the reversible capacity ($Q_{IR}$); to form chemically bonded and more stable SEI on the surface of the carbon particles which can better stand volume changes (of the carbon) during charge-discharge processes; and slow the rate of degradation processes at the carbon/electrolyte interface such as solvent polymerization and electrolyte reduction; to eliminate solvent cointercalation into the carbon (in cases of graphitic carbons).

As mentioned earlier, in the first charge of a carbon negative electrode cell there is an irreversible loss ($Q_{IR}$) of cathodic capacity to form a passivating layer (SEI) on the surface of the carbon particles. $Q_{IR}$ of high surface area carbons may reach a value of 1000 mAh/gr (of carbon) which make this kind of carbon useless for battery applications.

To decrease $Q_{IR}$, it is preferable to form the SEI on the surface of the carbon particles before assembling the battery. This can be done by coating the carbon particle, before or after making the negative electrode, by a very thin layer, preferably 2–10 nm, of Li⁺-conducting film, which is an electronic non-conductor, and which is insoluble in and compatible with the battery electrolyte. Materials for such synthetic SEI (SSEI) are: $MACO_3$, $M_2CO_3$, alkali semi-carbonates, MAO, $M_2O$, MAS, $M_2S$ and alkali-and alkaline-earth metal salts of surface carboxylic groups (M=alkali metal, MA=alkaline earth metal). The preferred metal ion for the synthetic SEI is lithium or at least it should be the major constituent with up to 30% (atomic) of another M or MA cation, or their mixture.

To make this SEI more flexible, it may contain up to 30% by volume of an organic elastomer, such as a polyalkanes.

This SSEI can be formed in several ways, such as precipitation from aqueous or non-aqueous solutions, pyrolysis or CVD, of appropriate precursors, or electrochemically. A $M_2CO_3$ film can be formed by casting from aqueous solution containing some binders such as PEO and evaporating the water prior or after binding the carbon particles with appropriate binder such as polytetrafluoroethylene. The amount of $M_2CO_3$ should fit the surface area of the particles, to form preferably a 2–10 nm thick film. An additional advantage of the SSEI is the elimination of the solvent cointercalation problem leading to graphite exfoliation and destruction.

Due to volume changes during the intercalation-deintercalation of lithium (especially for graphitic carbons) it is preferred to form a chemically bonded SEI (CBSEI), i.e. not only to physically coat SSEI but to bond it chemically to the surface of the carbon particles. There are several ways of doing it. The first step (I) is to form surface groups on the carbon particles and then to bond SEI to these groups. The preferred processes are to form oxygen bonds by using either acidic or basic surface groups formed in the first step. In case of acidic surface groups Step II is to convert them into alkali or alkaline earth carbonates or surface carboxylic salts, and finally (Step III)—coat this thin chemically bonded SEI with the appropriate material to the final desired thickness. Another process is to replace Steps II and III by in-situ electrochemical formation of SEI at the first charge of the battery. This chemically bonded SEI generally provides better mechanical stability to the SEI reducing its peeling off or cracking during the intercalation-deintercalation processes.

Another process to form chemically bonded SEI is through basic surface groups. This takes several stages: 1) Oxidation by wet air (at 0–150° C.), clean surface carbon particles (that were preheated in vacuum or in inert atmosphere at about 500–800° C.); Treating it with alkali metal hydroxides to form C—O—M surface groups; Passing $CO_2$ to form C—O—$CO_2$M surface carbonates.

Acidic surface groups can be formed by gas phase oxidation using dry or wet air or $O_2$ at temperatures between 250–650° C. depending on the type of carbon. The temperature is lower for non-graphitic and higher for graphitic carbons. It is also possible to form it by wet oxidation using aqueous solution of oxidizing materials such as $HNO_3$, concentrated $H_2SO_4$, $KClO_4$+acid, $H_2O_2$, etc.

Basic surface groups can be formed by reaction of clean surface carbon particles with basic aqueous solutions.

Fully graphitized carbon can be intercalated up to $Li_1C_6$ or up to 372 mAh/gr carbon. However, more lithium can be stored in crystal defects or in molecular size pits, pores, voids, cracks or flaws whose size or diameter is less than 1 nm (or preferably less than 0.6 nm). These carbons are called molecular sieve carbons. These molecular sieve carbons can be made by controlled oxidation, preferably by air or $O_2$ (dry or wet) at temperature range of 350 to 650° C. depending on the type of carbon. It is low for non-graphitic carbons and high for graphitic carbons. For each carbon optimum heat treatment temperature and time must be chosen, this gives a maximum increase in $Q_R$ and minimum in $Q_{IR}$.

It is believed that during mild oxidation pore formation and expansion takes place mostly at the edges of the graphite crystallites (or at the edges of the particles). As a result, large fraction of pores will have a crack-like structure, i.e. narrow long and deep cracks. These kinds of long and narrow cracks have been observed at the graphite crystallite edge in our laboratory by using the STM technique. Another way of characterizing pore size distribution is by absorption of a variety of gas molecules having different sizes and shapes. The size of the pores increases with the increase of the temperature and time of the oxidation. Flat molecules such as benzene would preferably be absorbed in the narrow cracks, while three dimensional molecules like 1,1-dimethyl hexane or 2,2 dimethyl-propane or tetra-phenyl-methane would not. For battery applications it is preferred to form narrow pores or cracks that can absorb molecules with a diameter (or width) smaller than 0.6 nm. If the pores are large solvent molecules can penetrate into them leading to increase in $Q_{IR}$.

$Q_R$ may be increased in another way, by using hard carbons which contain a large amount of point and plane defects. These defects may accommodate extra lithium. In general, the degree of disorder in the carbon increases as its formation (carbonization) or heat-treat temperature decreases. Low temperature carbons can be formed (at room temperature) in the dehydration reaction of carbohydrate such as sugars, starch, cotton having H to O ratio of 2:1. This can be done by using concentrated sulfuric acid or at moderate temperature pyrolysis of these materials under an inert atmosphere. After this carbonization process, the carbons can be heat treated at the desired temperature to get optimal concentration of point and plane defects or the highest $Q_R$.

During cycling the electrolyte continuously degrades. This derives from its reduction and from reduction induced solvent polymerization. It was found that an addition of small amounts of alcohols or water slowed down capacity fade. We also found that addition of MF and $Li_2CO_3$ to the electrolyte improved cycle life.

EXPERIMENTAL

All materials were processed and cells were built inside VAC glove boxes. We used two types of cells: The 1.5–5 $cm^2$ type A cells consisted of porous 0.5–0.6 mm thick graphite electrode which was placed inside a Clegard 2400 separator pocket and sandwiched between two lithium foils supported by a nickel Exmet screen. This cell was held together by two polypropylene plates and placed inside hermetically sealed glass vessels. The electrolytes in most experiments were 1.2M $LiAsF_6$ dissolved in ethylene carbonate:diethylcarbonate 1:2 or 1.5M $LiAsF_6$ dissolved in dioxolane. These cells were cycled, at room temperature, between 0.015 V and 0.8 V with the use of a homemade computerized cycler, $i_{int,av}$ was 0.21 $mA/cm^2$ (constant load) and $i_{din}$ was 0.32 $mA/cm^2$ (constant current).

The carbon or graphite electrodes were made of commercially available (or modified) carbon or graphite powders bound by polytetrafluoroethylene or polyvinilidenedifluoride and supported by a nickel Exmet screen.

In type B cells the carbon electrode was formed by spreading carbon-binder past on copper foil to form about 30–50 m thick porous carbon electrode which was vacuum dried at 170° C., where the binder was polyvinilidenedifluoride or at 270° C. for a Teflon binder.

Comparative Example 1

Type A cell was cycled with a Lonza 15$\mu$ R-LIBA-D powder anode and 1.2M $LiAsF_6$ ethylene carbonate:diethylcarbonate 1:2 electrolyte. Its cycle life is presented in FIG. 1, curve 2. Its maximum x was 0.75 (or $Q_R$=279 mAh/gr carbon) and it dropped to 0.5 after 13 cycles. Water content of the electrolyte was 200 ppm.

Example 2

The Lonza 15$\mu$ R-LIBA-D graphite powder was partially oxidized in air at 600° C. for 3.5 hours and lost 10% of its weight (Table 1). A type-A cell was assembled similar to that in Example 1. Its cycle life is presented in FIG. 1, curve 1. It is clear that x rose to 1 (372 mAh/gr carbon) and it lost only 23% of its capacity after 17 cycles.

Example 3

Figure 2:
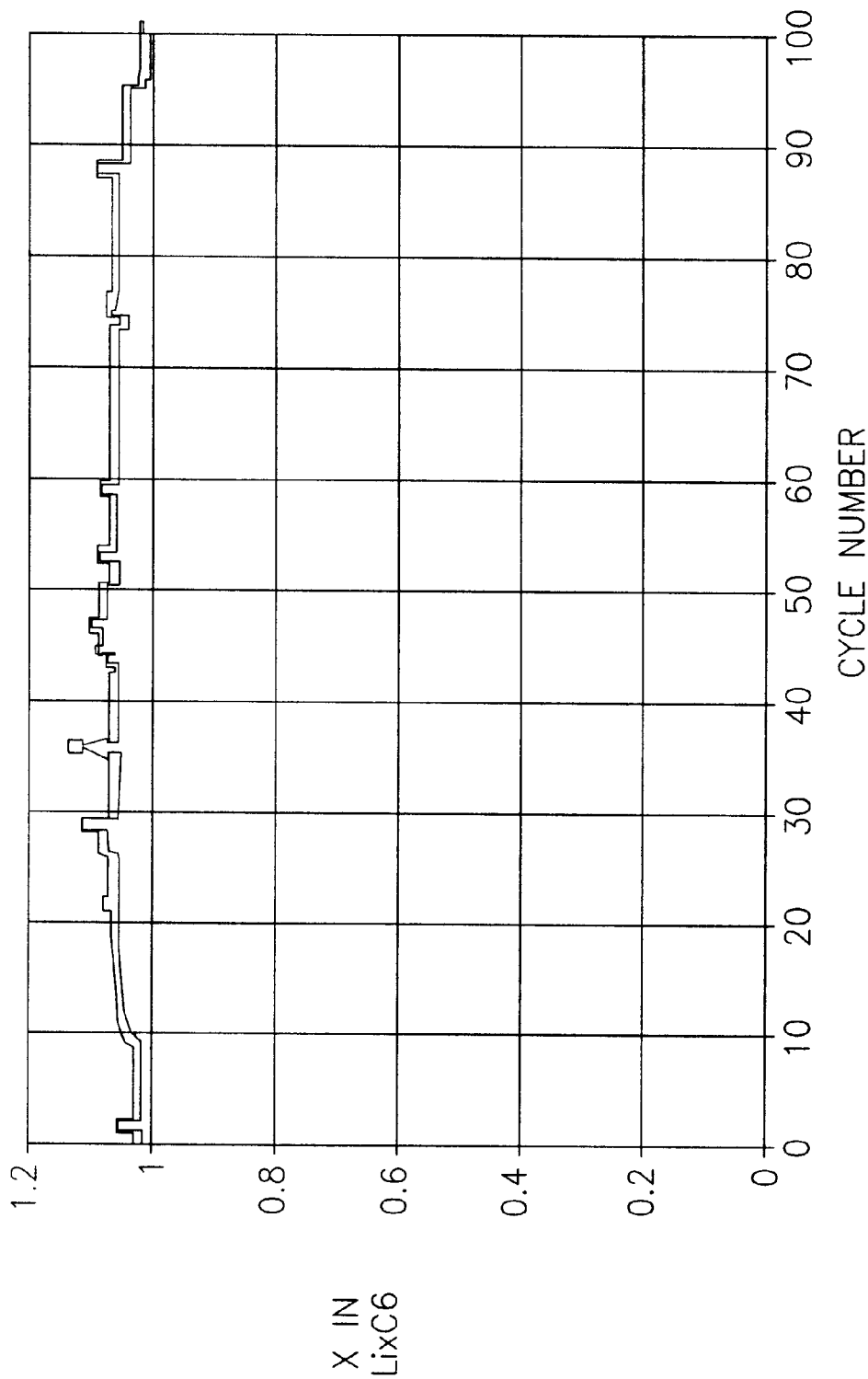

Lonza R-LIBA-D graphite powder was partially oxidized in air at 600° C. for 1.5 hours and lost 5% of its weight. It was mixed with Teflon binder emulsion spread on copper foil, cured in vacuum at 270° C. for 3 hours. A cell type B with an example 1 electrolyte (water content 60 ppm) was assembled and cycled. Its cycled life plot is presented in FIG. 2. This modified graphite anode exhibited x=1.2, i.e. $Q_R$ was over 400 mAh/gr and very stable over 100 cycles. It is believed that the increase of $Q_R$ results from the formation of micropores or narrow cracks which can accommodate additional lithium and the stability of the performance results from the formation of chemically bonded SEI (through surface carboxylic groups). This chemically bonded SEI provides stable protection to the graphite and SEI helps in preventing co-intercalation of solvent molecules. $Q_{IR}$ of this example is 23% lower than that of prestine graphite.

Comparative Example 4

Type B cell was cycled at the voltage range 2.5V–0.02 V with Asbury DB40R carbon anode and 1.2M $LiAsF_6$ ethylene carbonate:diethylcarbonate 1:2 electrolyte. Its $Q_R$ was 558 mAh/gr.

Example 5

A carbon anode with chemically bonded SEI and micropores was prepared as follows: Asbury DB40R carbon was outgassed at 800° C. in vacuum for 4 hours. Then it was partially oxidized at 400° C. for 4-hrs. It was neutralized with 0.1M LiOH aqueous solution to form lithium carboxylic layer on the surface of the carbon. A type B cell was assembled and cycled with 1.2M Li $AsF_6$ Ec:DEC 1:2 electrolyte. Its $Q_R$ was 688 mAh/gr 23% higher than that of Example 4. It was cycled over 20 cycles with no capacity loss.

Example 6

A Li/Polymer Electrolyte/carbon anode cell was assembled and cycled 60 times at 80° C. between 0.02V and 1.2V. X was (in $Li_xC_6$) 1.2. The carbon anode was DB40R prepared as described in example 5. The polymer electrolyte was casted from AN solution and vacuum dried at 100° C. for 4 hours. Its thickness was 100 nm and its composition was $(LiAsF_6)_1$ $P(EO)_{22}$ 6% by volume high surface area $Al_2O_3$. $LiAsF_6$ EC:DEC 1:2 electrolyte.

Example 7

A carbon powder was carbonized by $H_2SO_4$ dehydration of sucrose at room temperature. 170 gr of sucrose were mixed with 900 ml of cc $H_2SO_4$ for 24th. The resulting carbon cake was thoroughly washed with distilled water and finally neutralized by 0.1M LiOH. It was ball milled to particles smaller than 40 m and heat treated at 600° C. for 3 hours under Argon flow. Than, it was partially oxidized at 400° C. for 1 h, to form acid surface groups, cooled and neutralized with 0.1M LiOH. A type B cell was assembled and cycled at 0.02 to 1.5V. Its $Q_R$ was 450 mAh/gr and it showed stable cycle life.

Example 8

Cotton was carbonized under Ar at 620° C. for 5-hrs. It was partially oxidized to form acid surface groups at 400° C. for 0.5 hr, cooled and neutralized with 0.1M LiOH aqueous solution. The fine wiskers were ballmilled a type B cell was assembled and cycled with 1.2M $LiAsF_6$ ethylene carbonate:diethylcarbonate 1:2 electrolyte. $Q_R$ was over 450 mAh/gr and over 10 stable cycles have been demonstrated.

Example 9

Lonza R-LIBA-D graphite powder was outgassed under 800° C. for 4-hrs. It was cooled to room temperature and $H_2O$ saturated Ar was passed through it to form C—OH surface groups. It was treated with 0.01M aqueous LiOH and dried under $A_7$ at 150° C. for 3-hrs. to form C—O—Li surface group. $CO_2$ gas was passed through the sample to form surface carbonate groups. A type B cell was assembled with 1.2M $LiAsF_6$ ethylene carbonate:diethylcarbonate 1:2 electrolyte. It exhibited a very stable cycle life and a small $Q_{IR}$ and over 400 mAh/gr of reversible capacity.

Comparative Example 10

Type B Li/graphite cells were assembled with Lonza r-Liba-S graphite anodes and two different electrolytes. One cell consisted of outgas (800° C.-3 hours) graphite and 1M $LiClO_4$ ehtylene carbonate:diethylcarbonate (1:2) electrolyte (curve 4 FIG. 3). This cell lost 30% of its capacity after 10 charge-discharge cycles.

Figure 3:
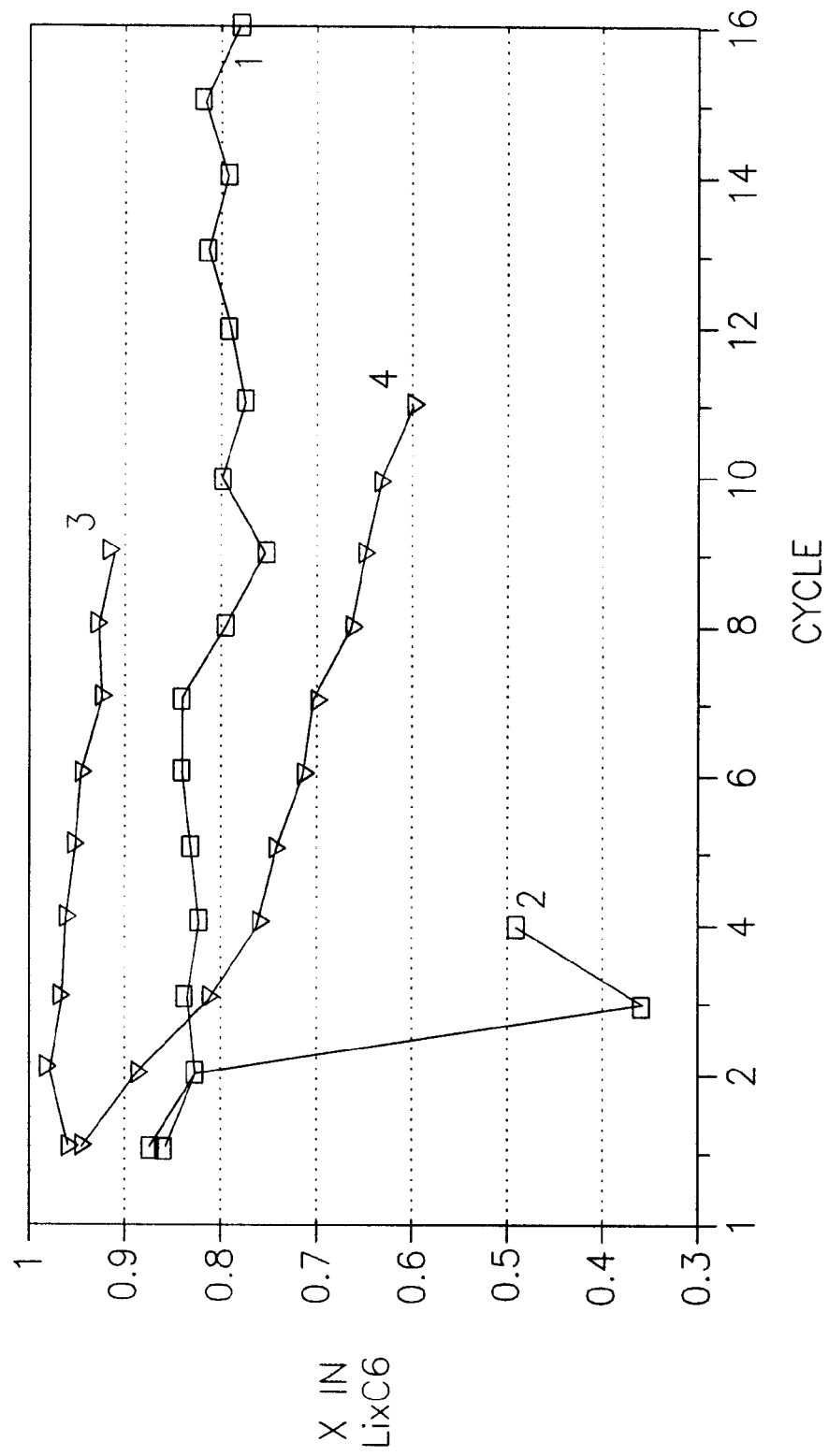

The second cell aimed to prove that when the SEI precursor layer formed by oxidation, is being removed by outgassing, the anode loses its stability (curve 2 in FIG. 3). This cell had 1M $LiClO_4$ Dioxolane:ethylene carbonate 4:1 electrolyte. It died after 4 charge-discharge cycles.

Example 11

Two type B Li/graphite cells have been assembled with a modified Lonza R-Liba-S graphite. One had 6% burnoff graphite (1 h, 55° C.) and 1M $LiAsF_6$ Dioxolane:EC 4:1 electrolyte (curve 1 in FIG. 30). The other one had the same graphite and 1M $LiClO_4$ ethylene carbonate:dimethylcarbonate 1:2 electrolyte (curve 3 in FIG. 3). Both of them had a higher capacity and much longer cycle life in comparison with their reference cells in Example 10.

Example 12

Carbon powder was prepared according to the following procedure; 70 gr. cotton cloth was crushed and treated with water to produce cellulose hydrate, which was filter pressed, dried at 150° C. and heated under nitrogen flow up to 530° C. in 150° C./hour heating rate. It was kept at this temperature for 3 hours. Then it was vacuum heated for 10 hours at 700° C. The pyrolysis yield was 18%. The carbon formed was oxidized in air at 325° C. for 25 minutes. A type B Li/carbon cell was assembled with 1.5M $LiClO_4$ ehtylene carbonate:diethylcarbonate 1:2 electrolyte, and cycled at 0.05 $mA/cm^2$, between 0.015 and 2V. The first deintercalation capacity was 446 mAh per 1 gr. of carbon, above the theoretical value for graphite (372 Mah (gr)).

This cell was cycled for 5 charge-discharge cycles with minor loss in capacity.

TABLE 1

Partial Oxidation of Carbon

| | Temperature (° C.) | Time (h) | Weight Loss (%) |
|---|---|---|---|
| GRAPHITE | 500 | 3.3 | 3 |
| RVG 1000 | 520 | 3.3 | 3 |
| | 535 | 3.3 | 8 |
| | 550 | 3.3 | 17 |
| | 580 | 2 | 3 |
| | 580 | 3.3 | 30 |
| LONZA-R-LIBAD | 600 | 1.5 | 5 |
| | 600 | 3.5 | 10 |
| | 620 | 5 | 30 |
| RVC 1000 | 395 | 3 | 5.3 |
| | 420 | 2 | 6 |
| | 450 | 2 | 18 |
| | 450 | 4 | 30 |
| NE7 | 550 | 0.25 | 1.1 |
| | 550 | 0.5 | 2.6 |
| | 550 | 1.0 | 11 |
| | 550 | 1.4 | 34 |

What is claimed is:

1. A non-aqueous electrochemical cell, comprising:
    a cathode;
    an electrolyte; and
    an anode comprising
        a core comprising carbonaceous particles bounded by a binder selected from the group consisting of polytetrafluoroethylene, polyvinilidenefluoride and a carbon-based material; and
        a solid electrolyte interphase film, said film forming a distinct layer surrounding said core; wherein said film is chemically bonded to the surface of said core, and wherein said film comprises at least one compound selected from the group consisting of alkali or alkaline-earth metal salt, an alkali or alkaline earth metal oxide, an alkali or alkaline-earth metal sulfide and any combination thereof; and
    wherein said film is an alkali cation conductor and an electronic insulator.

2. The cell according to claim 1, wherein said cathode comprises a lithium metal oxide that can reversibly intercalate lithium.

3. The cell according to claim 1, wherein said electrolyte comprises:
    i) a polymer electrolyte, or
    ii) a nonaqueous aprotic liquid and at least one alkali metal salt.

4. A cell according to claim 1, wherein said film comprises at least one compound that is insoluble in the electrolyte, wherein said compound is selected from the group consisting of an alkali or alkaline-earth metal salt, an alkali or alkaline earth metal oxide, an alkali or alkaline-earth metal sulfide, and any combination thereof.

5. A cell according to claim 4, wherein said film further comprises up to 30% by volume of an organic binder or polymer.

6. A cell according to claim 4, wherein said salt is selected from the group consisting of fluorides, chlorides, carbonates, semicarbonates, surface carboxylic salts, and a mixture thereof.

7. A cell according to claim 1, wherein the film is up to 0.1 µm thick.

8. A cell according to claim 1, wherein the film is bonded to a surface of the carbonaceous particles through oxygen bonds.

9. A cell according to claim 1, wherein the carbonaceous particles are graphite.

10. A cell according to claim 1, wherein the carbonaceous particles further comprise up to 10 atomic wt. % of an element selected from the group consisting of N, B, Al, Ca, Mg, and Si.

11. A cell according to claim 1, wherein the carbonaceous particles are partially oxidized.

12. A cell according to claim 11, wherein said partially oxidized particles lose up to 30% of their weight.

13. A cell according to claim 3, wherein the electrolyte comprises at least one compound selected front the group consisting of ethylene carbonate, propylene carbonate, dimethylcarbonate, diethylcarbonate and methylformate.

14. A cell according to claim 1, wherein the alkali metal salt is selected from the group consisting of $LiPF_6$, $LiAsF_6$, $CF_3SO_3Li$, $LiClO_4$, $LiN(CF_3SO_2)_2$, and any combination thereof.

15. A cell according to claim 3, wherein the polymer electrolyte further comprises a salt selected from the group consisting of $LiPF_6$, $LiAsF_6$, $CF_3SO_3Li$, $LiClO_4$, $LiN(CF_3SO_2)_2$, and any combination thereof.

16. A cell according to claim 2, wherein the cathode is selected from the group consisting of $LiMn_2O_4$, $LiMnO_2$, $Li_1CoO_2$, $LiNiO_2$, and $LiCo_xNi_{(1-x)}O_2$, wherein $0.01 < X < 0.99$.

17. A cell according to claim 3, wherein the electrolyte is an ionically conductive polymer comprising at least one of polyethylene oxide, polyacrilo nitrile, polyvinilidene difluoride, polymetamethyl methacrylate, wherein the electrolyte may contain up to 80 vol. % of at least one compound selected from the group consisting of ethylene carbonate, propylene carbonate, dimethylcarbonate, diethylcarbonate, and methylformate.

18. A method of making a non-aqueous electrochemical cell, comprising the steps of:

forming an anode by:
preparing a core, said core comprising carbonaceous particles; and
coating said core with chemically-bonded film of alkali metal carbonates or alkaline-earth metal carbonates or alkali carboxylic groups or a mixture thereof, wherein said film forms a distinct layer surrounding said core;

forming a cathode, whereby said cathode is in a discharging state;

placing said cathode and said anode in a cell containing an aprotic non-aqueous electrolyte; and charging the cell;

thereby making a non-aqueous electrochemical cell.

19. A method according to claim 18, further comprising oxidizing the carbonaceous particles with a gas selected from the group consisting of dry air, wet air, and $O_2$, thereby forming surface acidic groups and holes in the carbonaceous particles, wherein he carbonaceous particles lose up to 30% of their weight due to said oxidizing.

20. A method according to claim 19, wherein said holes are 0.3 to 0.6 nm in diameter.

21. A method according to claim 19, wherein carbonaceous particles lose 3 to 15% of their weight.

22. A method according to claim 19, wherein said oxidizing is at a temperature of 300° C. to 500° C. for non-graphitized carbonaceous particles.

23. A method according to claim 19, wherein said oxidizing is at a temperature of 450° C. to 640° C. for graphitized carbonaceous particles.

24. A method according to claim 19, further comprising treating said oxidized carbonaceous particles with alkali metal hydroxides or alkaline-earth metal hydroxides or their basic salts, thereby neutralizing the surface acidic groups and forming a layer of carboxylic salts that are chemically bound to surfaces of the carbonaceous particles.

25. A method according to claim 18, further comprising:
oxidizing the carbonaceous particles with an aqueous solution selected from the group consisting of $H_2O_2$, $H_2SO_4$, $HNO_3$, and $KClO_4$ to form surface acidic groups; and
washing and neutralizing the carbonaceous particles with an alkali metal hydroxide or alkaline-earth metal hydroxide or their basic salts.

26. A method according to claim 18, wherein form said layer comprises:
forming surface basic groups by reacting the carbonaceous particles with wet air at a temperature up to 150° C.;
reacting the carbonaceous particles with an alkali or alkaline-earth metal hydroxide at 50–200° C. to form C—O—M or C—(O)₂—MA surface groups; and
reacting the carbonaceous particles with $CO_2$ gas at room temperature to form C—O—CO₂M or C—(O—CO₂)₂—MA surface groups.

27. A method according to claim 18, further comprising forming said carbonaceous particles by dehydrating carbohydrates selected from the group consisting of $C_6O_6H_{12}$, polysaccharides, cellulose, and starch having the general formula $(C_6H_5H_{10})_n$, with concentrated $H_2SO_4$ or by moderate temperature pyrolysis in an inert atmosphere.

* * * * *